Jan. 27, 1942. C. C. CASTILLO 2,271,061
TRUCK DRIVE
Filed Aug. 5, 1940 2 Sheets-Sheet 1
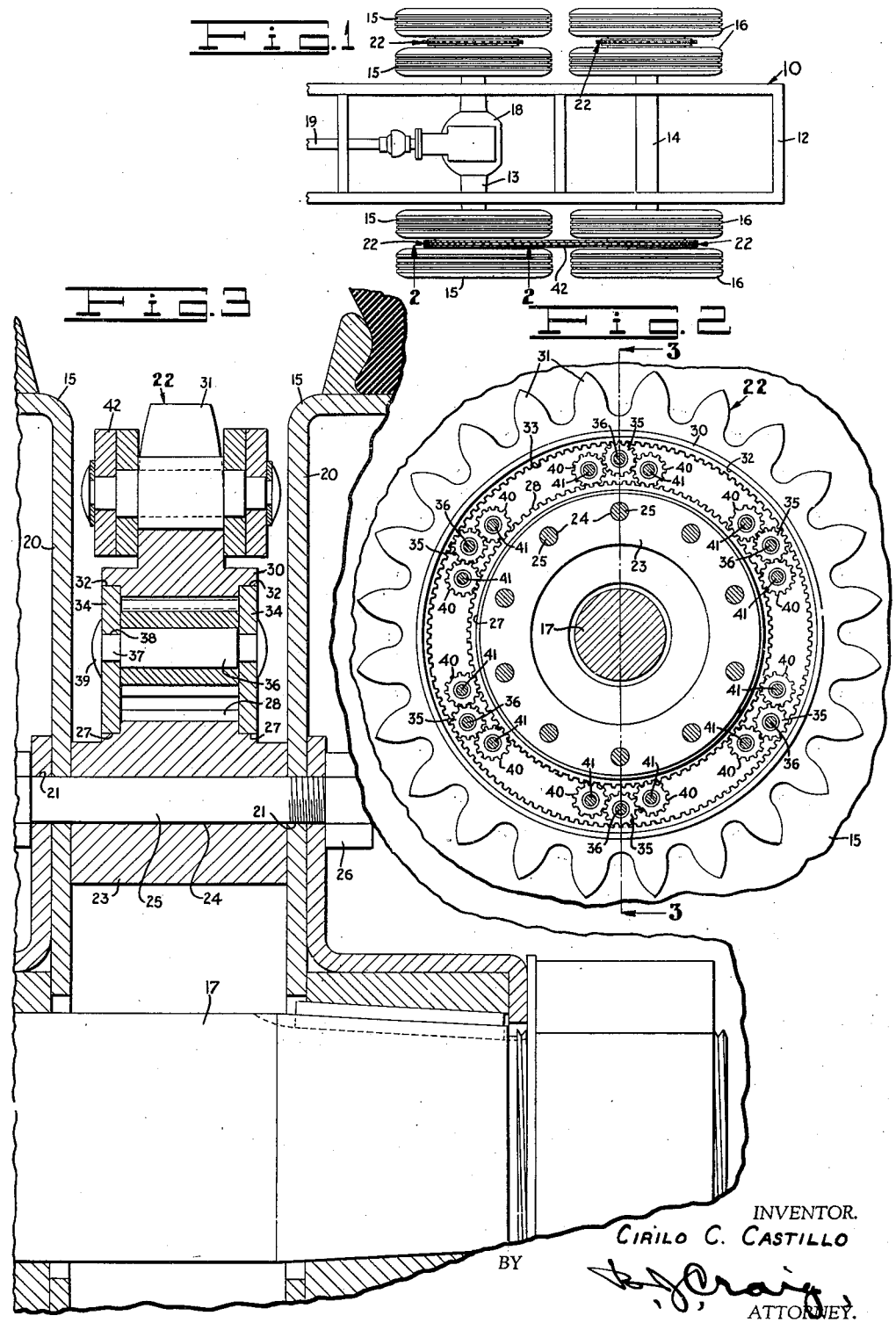
INVENTOR.
CIRILO C. CASTILLO
BY
ATTORNEY.

Jan. 27, 1942.  C. C. CASTILLO  2,271,061
TRUCK DRIVE
Filed Aug. 5, 1940  2 Sheets-Sheet 2
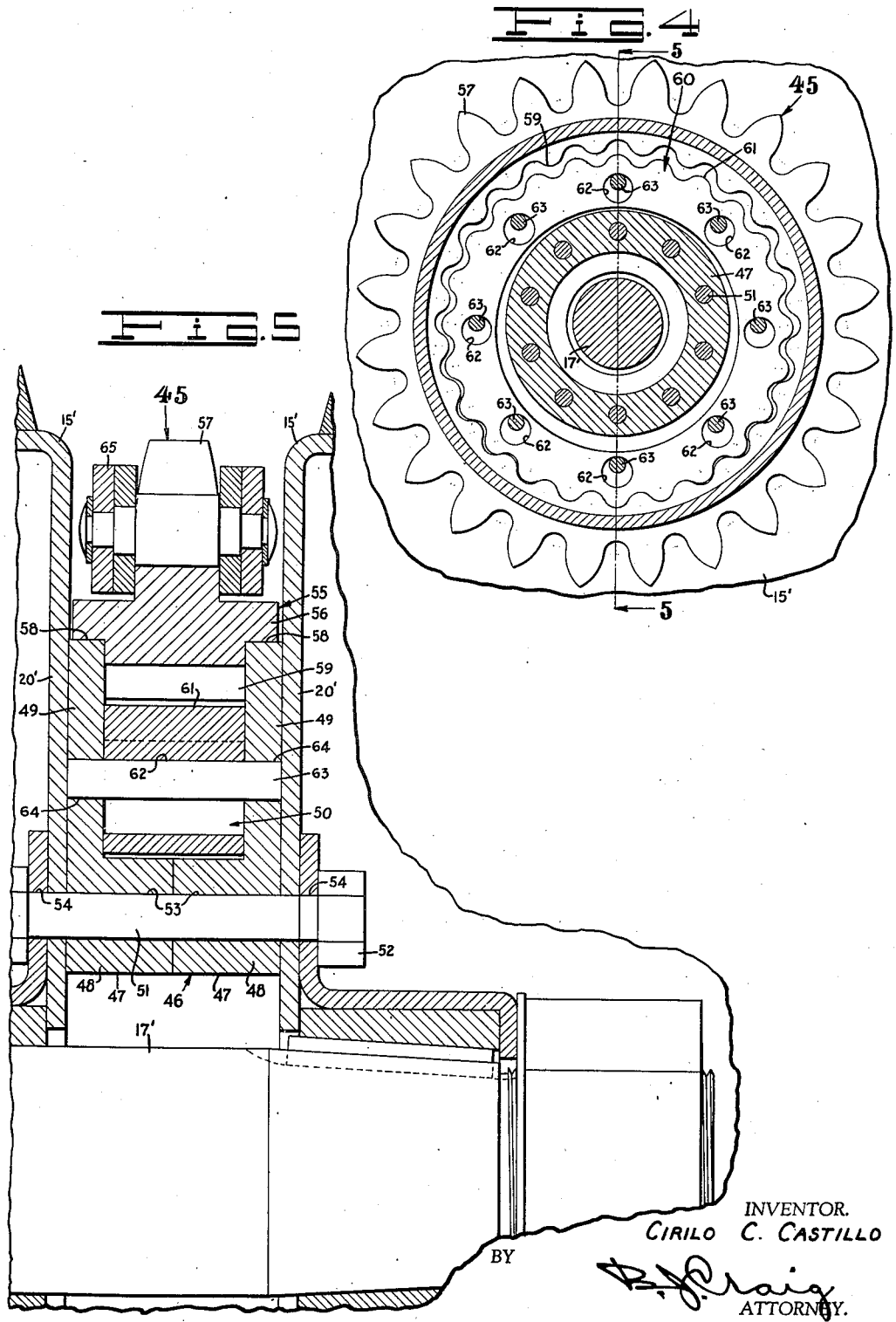
INVENTOR.
CIRILO C. CASTILLO
BY
ATTORNEY.

Patented Jan. 27, 1942

2,271,061

UNITED STATES PATENT OFFICE 2,271,061

TRUCK DRIVE

Cirilo C. Castillo, Los Angeles, Calif.

Application August 5, 1940, Serial No. 351,531

2 Claims. (Cl. 74—312)

This invention relates to improvements in wheel driving mechanisms for motor trucks.

The general object of the invention is to provide an improved means for driving one set of truck wheels from another power driven pair of wheels.

Another object of the invention is to provide a novel chain drive mechanism between two sets of truck wheels which includes differential mechanism to compensate for the differences between the diameters of the respective tires.

Other objects and the advantages of this invention will be apparent from the following description taken in connection with the accompanying drawings, wherein:

Fig. 1 is a fragmentary top plan view of the rear portion of a motor truck chassis embodying the features of my invention with one of the drive chains omitted;

Fig. 2 is an enlarged fragmentary section taken on line 2—2, Fig. 1 with the sprocket chain removed;

Fig. 3 is an enlarged fragmentary section taken on line 3—3, Fig. 2 with the sprocket chain in position;

Fig. 4 is a view similar to Fig. 2 showing a modified form of my invention; and

Fig. 5 is a fragmentary enlarged section taken on line 5—5, Fig. 4 with the sprocket chain in position.

Referring to the drawings by reference characters I have indicated the rear portion of motor truck chassis generally at 10. The chassis 10 includes a frame 12 supported in the usual manner on a forward axle housing 13 and a rear axle 14. The forward axle housing is supported by a set of pneumatic tires mounted on dual wheels 15 on each side of the frame 12 and the rear axle is supported by a similar set of dual wheels 16 on each side of the frame.

Each set of the wheels 15 is mounted on and secured to a driving axle 17 in any of the conventional ways and the axle 17 is driven from a differential mechanism 18 which in turn is driven by a propeller shaft 19.

As shown in Fig. 3 each of the wheels 15 includes adjacently facing side flanges 20 having a plurality of bolt receiving apertures 21 therein.

Positioned between each set of wheel flanges 20 I provide a differential sprocket device which I have indicated generally at 22.

As shown the device 22 includes an inner ring portion 23 surrounding the axle 17 and which is of the necessary thickness to space apart the wheels the desired distance. The ring 23 has a plurality of apertures 24 therein to match the wheel apertures 21.

Bolts 25 positioned in the wheel apertures 21 and in the ring apertures 24 and having nuts 26 thereon secure the ring 23 to the wheels 15.

The ring 23 has an enlarged shoulder 27 thereon on each side which is of less width than the ring and extending outwardly from the shoulder 27 I provide a gear toothed portion 28 which is of less width than the shoulders 27.

Surrounding the ring 23 I provide a sprocket ring 30 which has sprocket teeth 31 projecting outwardly therefrom. Each side of the ring 30 has an outwardly opening peripheral recess 32 therein and between the recesses 32 I provide a gear toothed portion 33 similar to the gear toothed portion 28 of the ring 23.

Positioned in each of the recesses 32 of the sprocket ring 30 and engaging the shoulders 27 of the ring 23 I provide an annular side plate 34.

Positioned between the side plates 34 in the space between the rings 23 and 24 I provide a plurality of gears 35 which mesh with the gear teeth 33 of the sprocket ring 30 and do not engage the gear teeth of the ring 23. Each of the gears 35 is rotatably mounted on a stud 36 which has reduced end portions 37 positioned in apertures 38 in the side plates 34 and then riveted over or otherwise secured as at 39.

Associated with each of the gears 35 I provide a pair of gears 40 one positioned at each side of the gear 35 and meshing therewith and also meshing with the gear teeth 28 of the ring 23. The gears 40 are rotatably mounted on studs 41 similar to the studs 36 of the gears 35.

The devices 22 may be provided on the drive wheels 15 with a simple sprocket on the driven wheels or the device may be provided on the driven wheels with a simple sprocket on the drive wheels or the device may be provided on both the driven and the drive wheels as shown in Fig. 1. When the devices 22 are installed on a motor truck the devices 22 on the rear wheels 16 are driven by the devices 22 on the drive wheels 15 by means of a sprocket chain 42.

When the tires on the drive wheels 15 and on the driven wheels 16 are of the same diameter the sprocket ring 30 through the medium of the gears 35 and 40 rotates the ring 23 at the same speed at which it is rotated. But when the tires on the drive and driven wheels vary, due to wear, or other causes, the sprocket ring 30 on the driven wheel or the sprocket ring 30 on the drive (depending upon which tire is worn) will as it rotates slowly rotate in advance of the ring 23 as it drives the ring 33 thus compensating for the differences in the diameters of the wheels.

In Figs. 4 and 5 I have indicated a modified form of my invention generally at 45. The device 45 is adapted to be mounted on a dual truck wheel similar to the device 22 previously described and I have indicated the truck wheel and its associated parts by similarly primed reference numerals.

The device 45 includes a base ring 46 surrounding the axle 17'. The base ring 46 is made in two identical portions 47 each of which includes an inner body portion 48 having enlarged flange portions 49 thereon which form an outwardly opening circumferential groove or chamber 50 in the base ring 46. The base ring 46 is of a width to correctly space the wheels 15' and is secured to the wheels by a plurality of bolts 51 and nuts 52.

The bolts 51 are positioned in apertures 53 in the base ring body 47 and in apertures 54 in the wheel flanges 20'.

Surrounding the base ring 46 I provide a sprocket ring 55 which includes a circular body portion 56 having outwardly extending sprocket teeth 57 thereon. Each side of the body portion 56 has an inwardly and outwardly opening recess 58 therein in each of which one of the side flanges 49 of the base ring is positioned.

The portion of the body 56 between the flanges 49 has inwardly extending arcuately shaped gear teeth 59 formed thereon which form a gear ring 59'.

Positioned within the chamber 50 of the base ring 46 I provide a gear ring 60 which has outwardly extending arcuately shaped gear teeth 61 formed thereon. The gear ring 60 is of less diameter than the gear teeth ring 59'.

The gear ring 60 has a plurality of apertures 62 therein in which studs 63 are positioned. The studs 63 are positioned in apertures 64 in the side flanges 49 of the base ring 46. The difference in the size of the apertures 62 and the studs 64 is equal to slightly more than the depth of the teeth 61.

One portion of the gear teeth 61 meshes with the gear teeth 59 such as on the bottom side as shown in Fig. 4 and the gear teeth 61 on the top are fully out of mesh with the gear teeth 59.

In operation the sprocket ring 57 is adapted to be driven from a drive wheel by a sprocket chain 65 in the same manner as previously described in connection with the device 22.

In operation when the tires on both the drive wheel and the driven wheel are the same diameter the sprocket ring 55 through the medium of the gear teeth 59 and 61 rotates the gear ring 60 at the same speed as that at which it is rotated and the gear ring 60 through the medium of the studs 63 rotates the base ring 46 which through the medium of the bolts 51 rotates the wheels 15'.

When the tires on the driven and drive wheels are not the same diamter rotation of the sprocket ring 55 causes the gear ring 60 to have a slight oscillating movement about the axis of the studs 63 thus moving the teeth 61 thereon into and out of engagement with portions of the sprocket ring teeth 59 which allows the sprocket ring to rotate faster than it rotates the ring 60 thereby compensating for the difference in the diameters of the tires.

From the foregoing description it will be apparent that I have provided a novel chain drive differential mechanism which is simple in construction and highly efficient in use.

Having thus described my invention I claim:

1. In combination with a wheel, a differential device, said device including a cylindrical body secured to said wheel and adapted to rotate about the axis of said wheel, said body having spaced planar ends, said ends being parallel, an enlarged annular shoulder adjacent each side of said body, said shoulders being spaced from said planar ends, said body including an outwardly extending peripheral gear toothed portion between said shoulders, the base circle of said gear toothed portion being of substantially greater diameter than the diameter of said annuar shoulders, an annular sprocket ring surrounding said body and spaced therefrom, said ring having outwardly extending sprocket teeth thereon, said ring on each side thereof having a peripheral recess therein, said ring between said recesses having inwardly extending gear teeth thereon, side plate members positiond in said ring recesses and engaging said body shoulders, a plurality of spaced gears rotatably mounted between said side plates and meshing with said gear teeth of said ring, and a gear associated with each of said first gears and meshing with said first gears and with said gear teeth on said body, and means to rotatably support said second gears on said side plate members.

2. In combination with a wheel, a differential device, said device including a cylindrical body secured to said wheel and adapted to rotate about the axis of said wheel, said body having spaced planar ends, said ends being parallel, an enlarged annular shoulder adjacent each side of said body, said shoulders being spaced from said planar ends, said body including an outwardly extending peripheral gear toothed portion between said shoulders, the base circle of said gear toothed portion being of substantially greater diameter than the diameter of said annular shoulders, an annular sprocket ring surrounding said body and spaced therefrom, said ring having outwardly extending sprocket teeth thereon, said ring on each side thereof having a peripheral recess therein, said ring between said recesses having inwardly extending gear teeth thereon, side plate members positioned in said ring recesses and engaging said body shoulders, a plurality of spaced gears positioned between said side plates and meshing with said gear teeth of said ring, means to rotatably support said gears, a pair of gears associated with each of said first gears and meshing therewith one being arranged on each side thereof, said pairs of gears meshing with said gear teeth on said body and means to rotatably support said pairs of gears on said side plate.

CIRILO C. CASTILLO.